US008063604B2

(12) United States Patent
Shaffer et al.

(10) Patent No.: US 8,063,604 B2
(45) Date of Patent: Nov. 22, 2011

(54) SYSTEM FOR ASSOCIATING RENEWABLE ENERGY SOURCES AND CONSUMERS

(75) Inventors: Shmuel Shaffer, Palo Alto, CA (US); Richard Gustav Geiger, San Jose, CA (US); Guido Jouret, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 441 days.

(21) Appl. No.: 12/403,916

(22) Filed: Mar. 13, 2009

(65) Prior Publication Data
US 2010/0231160 A1 Sep. 16, 2010

(51) Int. Cl.
*H01M 10/44* (2006.01)
(52) U.S. Cl. ........................................ 320/101
(58) Field of Classification Search .................. 320/101
See application file for complete search history.

(56) References Cited

U.S. PATENT DOCUMENTS

| | | | | |
|---|---|---|---|---|
| 7,105,940 | B2 * | 9/2006 | Weesner et al. | 290/44 |
| 2009/0079161 | A1 * | 3/2009 | Muchow et al. | 280/400 |
| 2009/0216387 | A1 * | 8/2009 | Klein | 700/296 |

OTHER PUBLICATIONS

"How Does Internet Radio Work?", Internet Radio, http://iml.jou.ufl.edu/projects/Students/Derechin/DOCUMENT5.HTM , p. 1.

* cited by examiner

*Primary Examiner* — M'Baye Diao
(74) *Attorney, Agent, or Firm* — Merchant & Gould

(57) ABSTRACT

In one embodiment, a system comprises: a renewable energy generator; a renewable energy availability server connected to the renewable energy generator, wherein the renewable energy server is connected to an electric grid and a network, the renewable energy availability server is configured to transmit a right to recharge certificate; a rechargeable device containing a recharge controller, wherein the recharge controller is connected to the electrical grid, the recharge controller configured to receive upon request the right to recharge certificate; and the recharge controller being further capable of enabling charging of the rechargeable device based on the right to recharge certificate.

19 Claims, 3 Drawing Sheets

SYSTEM FOR ASSOCIATING RENEWABLE ENERGY SOURCES AND CONSUMERS

FIELD OF THE DISCLOSURE

The present disclosure relates to renewable energy sources and the association of the renewable energy sources to rechargeable consumer devices.

BACKGROUND

A growing number of programs now exist for the development and sale of electric vehicles which may be powered wholly or in part by electricity. In parallel, there has also been rapid growth in the development of what is termed renewable "point generation" wherein renewable sources of energy such as solar panels or wind turbines can provide power to a grid.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure.

DETAILED DESCRIPTION

Figure 1:
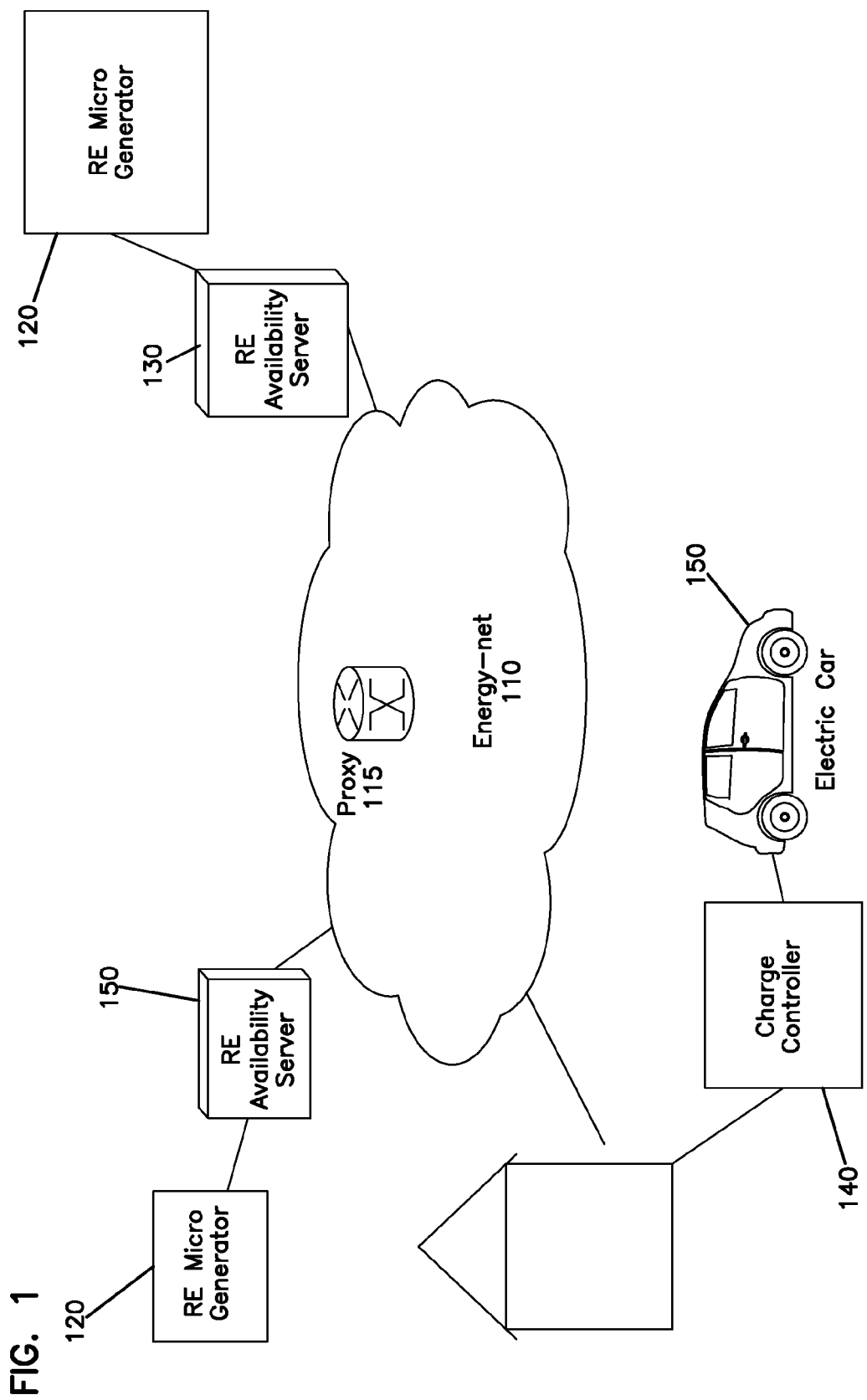
FIG. 1 is a block diagram of an environment for associating renewable energy sources with consumers.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

While recharging an individual device may not present a significant load to the electric grid, growing numbers of rechargeable consumer devices, such as electric cars, in the aggregate may present a significant load that must be properly managed to avoid overloading the grid. An overload condition may occur when users attempt to consume more power than is available at any given time in a particular section of the grid.

While some solutions may permit recharge of consumer devices only during off-peak hours when sufficient capability is presumed to be available, these solutions are open-loop and do not monitor or prevent overload and does not readily provide for recharge that may be required by a user on an urgent basis without waiting for a pre-determined off-peak time.

Renewable point generation such as wind or solar may become useful adjuncts to supply power into an electric grid. However, renewable energy sources, such as wind and solar energy may be intermittent and variable in nature. The direction and velocity of wind may vary. Solar energy may be readily obscured by cloud cover which may reduce solar panel output significantly for brief or lengthy periods of time. Therefore, as renewable energy generators may be attached to the electric grid, utilities may assume that a relatively low percentage of the renewable energy power may be available at any given time.

Alternatively, traditional sources of power generation, such as oil, coal, gas fired generation, hydroelectric generation, and nuclear generation may be steady suppliers of large amounts of power. However, these traditional sources of power generation require significant time to start up and/or shut down.

Because utilities must satisfy consumer demand at any given time, renewable energy may not substantially help reduce spinning reserves, also known as operational reserves. When a utility forecasts an imbalance between load and generation capacity, it may issue a Demand Reduction (DR) request and wait for consumers to adjust their consumption accordingly. Under a more severe imbalance condition, when demand is projected to exceed supply, utilities may issue Load Control (LC) commands and remotely turn off loads. Nevertheless, DR and LC requests may be too slow to respond to unplanned generation down time.

Utilities may also employ instantaneous demand reduction by employing frequency sensitive relays. Frequency sensitive relays may usually be used to turn off large industrial operations which can tolerate intermittent brownouts with a small financial impact. In exchange, utilities may compensate these consumers with a favorable electric rate.

The wide adoption of renewable energy generation and the proliferation of electric cars may hamper the planning ability of utilities and may increase the number of brownouts. Therefore, a need exists for a system to minimize the impact of fluctuations of availability of renewable energy on the overall electric grid. Specifically, there exists a need to reduce the frequency and length of brownouts which may be caused by triggering frequency sensitive breakers and other overload protection mechanisms.

Embodiments may be disclosed herein that provide systems, devices, and methods of charging a rechargeable device. One such embodiment is a system comprising: a renewable energy generator; a renewable energy availability server connected to the renewable energy generator, wherein the renewable energy server is connected to an electric grid and a network, the renewable energy availability server is configured to transmit a right to recharge certificate; a rechargeable device containing a recharge controller, wherein the recharge controller is connected to the electrical grid, the recharge controller configured to receive upon request the right to recharge certificate; and the recharge controller being further capable of enabling charging of the rechargeable device based on the right to recharge certificate.

Embodiments of the invention may also include: a method comprising:
creating a peer-to-peer relationship over an electric grid between a recharge controller connected to a rechargeable device and a renewable energy availability server connected to a renewable energy generator; extending a right to recharge certificate from the renewable energy availability server to the recharge controller; recharging the rechargeable device based on the contents of the right to recharge certificates.

Other embodiments include: a method comprising initiating a charge cycle for a rechargeable device; locating an underutilized renewable energy generator; associating the underutilized renewable energy generator with the rechargeable device; enabling the rechargeable device to access power from the underutilized energy generator; and controlling the amount of power made available to the rechargeable device.

Note that a rechargeable device may be any energy consuming device which may operate with a partial energy supply such as lower current than their nominal power consumption. Similarly, the process of charging may encompass the consumption of energy at lower power than a peak energy consumption. Thus, rechargeable devices may be operated at a slower speed or interrupted without resulting in a major adverse impact to the rechargeable device or its users.

FIG. 1 illustrates an environment in which embodiments of the invention may be located. The illustrated system may deliver electric power to consumers over an electric grid (not shown). A renewable energy generator 120 and a recharge controller 140 may be connected to the electric grid. Other conventional generators and other consumption devices may also be connected to the grid and may not be operating under embodiments of the invention. A energy net 110 may be a control I communication network. One source of electric power may be the renewable energy generation station 120. The renewable energy generation station may be operable using wind power, solar power, or other renewable energy sources. Each renewable energy generation station 120 may employ a renewable energy availability server 130.

The renewable energy availability server 130 may monitor the availability of power from the associated renewable energy generation station 120. The renewable energy availability server 130 also may control in real time the energy consumption of any number of rechargeable devices, such as electric cars 150 which could withstand interrupted power for a short time or operate with lower than nominal charge current without any financial consequence.

When the renewable energy generation station 120 has sufficient power to recharge a consumer's electric car 150, a right to recharge certificate may be extended to the consumer. In embodiments of the present invention, the renewable energy availability server 130 may operate in an on/off mode, wherein a right to recharge certificate may either be extended to enable recharging of electric car 150, or withdrawn so that the recharging process may be halted. For example, the renewable energy generation station 120 may experience a loss in power generation conditions (e.g., the wind may slow down or solar cells may be partially covered by fog or mist). In that situation, the renewable energy availability server 130 may withdraw the right to recharge certificate which may result in the immediate halt of energy consumption available to the electric car 150.

In embodiments of the present invention, the renewable energy availability server 130 may operate in a continuous mode, wherein a right to recharge certificate may be extended to enable recharging of electric car 150. The right to recharge certificate may indicate to the consumer how much energy is available for consumption. This indication may be provided as an absolute number of Kwatts. In some embodiments this indication may be provided as a percentage of the consumer's maximum demand. This indication may be received by a recharge controller 140 associated with electric car 150.

The recharge controller 140 may adjust the level of charge provided to electric car based on the indication provided in the received right to recharge certificate and continue to charge the electric car 150 at the adjusted level. For example, the renewable energy generation station 120 may experience a loss in power generation conditions (e.g., the wind may slow down or solar cells may be partially covered by fog or mist). In that situation, the renewable energy availability server 130 may modify the right to recharge certificate which may result in the immediate lowering of energy consumption available to the electric car 150.

In order to operate in embodiments in the present invention, each electric car 150 may be equipped with a recharge controller 140. When the consumer initiates the charge cycle, the Energy-Net 110 may search to locate an underutilized renewable energy generation station 120 and associate it with the electric car 150. As part of this association, a peer to peer relationship may be established between the recharge controller 140 of the electric car 150 and the renewable energy availability server 130 associated with the underutilized renewable energy generation station 120.

Using the established peering channel, the renewable energy availability server 130 may extend a right to recharge certificate to the recharge controller 140 of the electric car 150. In some embodiments, the recharge controller 140 may simply be associated with the electric car 150 and may not be physically located on the electric car 150. The electric car 150 may then recharge its battery as long as it has access to the right to recharge certificate. If the recharge controller 140 loses the right to recharge certificate, the electric car 150 may stop the recharging process. Alternatively, if the recharge controller 140 receives a modification to the right to recharge certificate, the electric car 150 may modify the recharging process.

The techniques employed by embodiments of the right to recharge certificate operating in an on/off mode will now be described. The peering process between the recharge controller 140 of the electric car 150 and the renewable energy availability server 130 associated with the underutilized renewable energy generation station 120 may operate in a manner similar to how a web radio client tunes in to a web radio station. The right to recharge certificate may be embodied by a continuous audio stream of a 5 KHz signal. This may indicate that the renewable energy availability server 130 is enabled in the "on" mode.

Note that 5 KHz only represents the frequency used in some embodiments of the invention. One advantage of using a frequency at or around 5 KHz may be that the cycle time of 0.2 ms for such a frequency can be up to 100 times shorter than that of an electric grid. Thus, use of this frequency may allow for a response much faster than that employed by existing frequency based breakers.

As long as the renewable energy generator has sufficient energy to supply power to the peered consumer rechargeable device 150, the renewable energy availability server 130 may continue to transmit the right to recharge certificate to the recharge controller 140. The recharge controller 140 may receive the continuous signal which may subsequently enable the recharge controller to recharge the rechargeable device 150.

In some embodiments, the peering process between the recharge controller 140 of the electric car 150 and the renewable energy availability server 130 associated with the underutilized renewable energy generation station 120 may operate in a continuous mode. The right to recharge certificate may be embodied by a modifiable audio stream wherein, for example, a 5 KHz signal may represent full enablement of the recharge controller 140 allowing it to recharge at the maximum level. In the event that the renewable energy availability server 130 may determine that the amount of energy desired by the recharge controller 140 is not available, the renewable energy availability server 130 may disable the right to recharge certificate.

The renewable energy availability server 130 may continuously monitor the power available from the renewable energy generator 120. In the event that the renewable energy availability server 130 may determine that less than the maximum level desired by the recharge controller 140, the renewable energy availability server 130 may modify the frequency of the right to recharge certificate. For example, if the renewable energy generator 120 experiences a partial loss, e.g., 20%, of its generation capacity, the associated renewable energy availability server 130 tunes the frequency down to 4 KHz.

When the renewable energy availability server 130 tunes the frequency to a lower level, the right to recharge certificate notifies the recharge controller 140 that it may only operate at 80% of its previous level to minimize the effect on the total electric grid. It should be noted that the change in frequency of the right to recharge certificate may take place during one frequency cycle of the right to recharge certificate. The frequency modulation of the right to recharge certificate may take about 0.2 ms, a time period which is shorter by two orders of magnitude than the response time of frequency breakers. As a result, fluctuations in availability of renewable energy may be mitigated without invoking disruptive frequency breakers.

The energy consumption by the rechargeable device 150 may start by the rechargeable device 150 requesting permission to charge from the Energy-Net 110 In some embodiments, the permission request may go directly to a renewable energy availability server 130. In some embodiments, the permission request goes to proxy 115. Proxy 115 may have visibility into the various renewable energy availability servers 130 and may match the rechargeable device 150 to a specific renewable energy availability server 130 which may have sufficient capacity to charge rechargeable device 150. If the recharge controller 140 detects great fluctuations in quality of energy from renewable energy availability server 130, the recharge controller 140 may request an IP address of another renewable energy availability server 130 from the proxy 115. This process may act similarly to the process of scanning for a new radio station on a web radio client.

In some embodiments, the GPS location of the rechargeable device 150 and the renewable energy generator 120 may be known by the proxy 115. The proxy 115 may use this geographical information to provide preference for associating rechargeable devices 150 with a local renewable energy generator 120 thus reducing congestion on long haul transmission lines.

Figure 2:
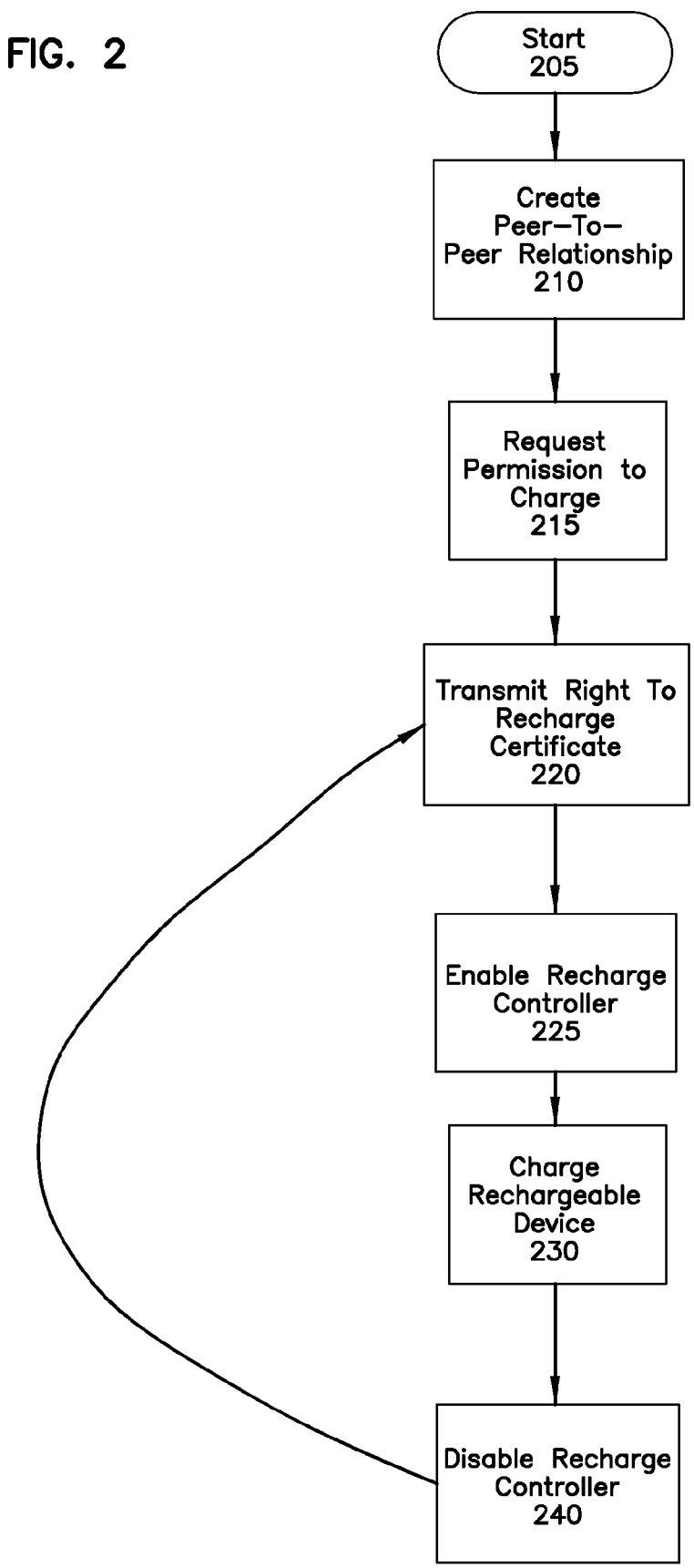
FIG. 2 is a block diagram of a method for associating renewable energy sources with consumers.

FIG. 2 illustrates a flow chart showing embodiments of the present invention. The method may start at step 205. The method then may move to step 210 where a peer-to-peer relationship may be created over an electric grid 110 between a recharge controller 140 connected to a rechargeable device 150 and a renewable energy availability server 130 connected to a renewable energy generator 120. In embodiments of the invention, the rechargeable device may be an electric car. The method may then advance to step 215 wherein the rechargeable device 150 may request permission to charge from the Energy-Net 110. In some embodiments, this request may go directly to a specific renewable energy availability server 130. In some embodiments, the request goes to the proxy 115. Proxy 115 may have visibility into the various renewable energy availability servers 130 and may match the rechargeable device 150 to a specific renewable energy availability server 130 which may have sufficient capacity to charge rechargeable device 150.

From step 215 the method may advance to step 220 where a right to recharge certificate may be transmitted from the renewable energy availability server 130 to the recharge controller 140. In some embodiments, the association may be made directly between the renewable energy availability server 130 and the recharge controller 140. In some embodiments, the association is made between the proxy 115 and the recharge controller 140. The proxy 115 may aggregate the availability data for multiple renewable energy availability servers 130 and may present a cumulative view of renewable energy availability to the recharge controller 140. In some embodiments, the right to recharge certificate may be transmitted via a variable frequency. In some embodiments, this frequency may be at or about 5 KHz.

After transmission of the right to recharge certificate, the method may advance to step 225 wherein the recharge controller 140 may be enabled by the right to recharge certificate. The method may then continue to step 230 where the rechargeable device is recharged based on the contents of the right to recharge certificates. In some embodiments, the contents of the right to recharge certificate may represent an available amount of energy expressed as an absolute amount of kilowatts available. In some embodiments, the contents of the right to recharge certificate may represent a percentage of available energy as compared to the maximum desired by the recharge controller 140. If the right to recharge certificate is pulled or becomes invalid for some reason (e.g., network issues), the method may proceed to step 240 wherein the recharge controller 140 may halt the recharging process until a new valid right to recharge certificate is received by the recharge controller 140. This is indicative of a renewable energy availability server 130 operating in "on/off" mode. From step 240, the method may proceed into an idle mode waiting for a new right to recharge certificate which may move the method back to step 220.

In some embodiments, the recharge controller 140 may request that the Energy-Net 110 associate it with a different renewable energy availability server 130. As a result, proxy 115 may identify another prospective renewable energy generator 120 and associate it with the recharge controller 140. In some embodiments, the proxy 115 may act on behalf of multiple renewable energy availability servers 130 and may present a cumulative view of available renewable energy to the rechargeable device 150.

Figure 3:
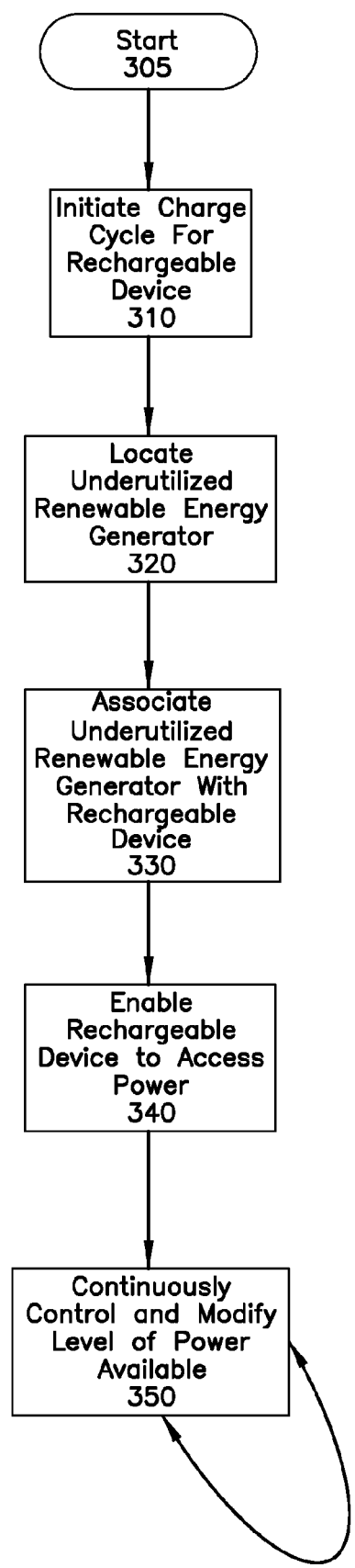
FIG. 3 is a block diagram of a method for associating renewable energy sources with consumers.

FIG. 3 illustrates a flow chart showing embodiments of the present invention. The method may start at step 305. The method may then move to step 310 where a charge cycle may be initiated for a rechargeable device 150. In some embodiments, the charge cycle may be initiated by the recharge controller 140 of the rechargeable device 150 requesting a right to recharge certificate. Furthermore, the charge cycle may be initiated on behalf of the rechargeable device 150 from another endpoint connected to the Energy-Net 110. In some embodiments the rechargeable device 150 may be an electric car. After a consumer initiates a charge cycle at step 310, the method may advance to step 320 where an underutilized renewable energy generator 120 may be located. Various renewable energy availability servers 130 may be queried to locate an underutilized renewable energy generator 120. In some embodiments, the electrical grid 110 may be aware of its geographical layout and may search for geographically close renewable energy generators 120 first.

From step 320, the method may proceed to step 330 where the underutilized renewable energy generator 120 may be associated with the rechargeable device 150. This association may be a peer-to-peer relationship established between the underutilized renewable energy generator 120 and the rechargeable device 150. Once the association is made in step 330, the method may continue to step 340 where the rechargeable device 150 may be enabled to access power from the underutilized renewable energy generator 120. The step of enablement may include the transmission of a right to recharge certificate from a renewable energy availability server 130 to a recharge controller 140.

In some embodiments the right to recharge certificate may be transmitted via a variable frequency. This frequency may be associated with the amount of power available from the renewable energy generator 120. In some embodiments, the frequency may be associated to the percentage of power available as compared to the maximum power the recharge controller 140 is capable of drawing. From step 340, the method may continue to step 350 where the amount of power the rechargeable device 150 may be permitted to draw may be continuously controlled. The availability of power from the renewable energy generator 120 may be continuously monitored. When a change in available power may be determined, the renewable energy availability server 130 may modify the frequency of the right to recharge certificate.

The methods and systems described may be embodied in any computer-readable medium for use by or in connection with an instruction execution system, apparatus, or device. Such instruction execution systems may include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality may partitioned among components in some embodiments disclosed herein. Other divisions of functionality may also be possible, and these other possibilities may be intended to be within the scope of this disclosure. Furthermore, to the extent that software components may be described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

While an electric car was used in the description to illustrate a rechargeable device 150, it should be understood that this should not be viewed as a limiting example in regards to the claims. Any energy consuming or energy storing device may be used in the described systems and methods. Furthermore, it should be noted that renewable energy was used only for illustrative purposes and various other forms of energy generation may be used without changing the spirit of the invention.

The Energy-Net may be a control/communication network. This network may utilize wired, wireless, radio communication over the power line or any combination of the above. The Energy Net may be a low delay SCADA (Supervisory Control And Data Acquisition) network which may include the proxy server described above or other application servers.

The flow charts, messaging diagrams, state diagrams, and/or data flow diagrams herein provide examples of some embodiments of the present invention. Alternatively, these diagrams may be viewed as depicting actions of an example of a method implemented by some embodiments of the invention. Blocks in these diagrams represent procedures, functions, modules, or portions of code which include one or more executable instructions for implementing logical functions or steps in the process. Alternate implementations may also be included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Modifications or variations are possible in light of the above teachings. The implementations discussed, however, were chosen and described to illustrate the principles of the disclosure and its practical application to thereby enable one to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A system comprising:
    a renewable energy generator;
    a renewable energy availability server connected to the renewable energy generator, wherein the renewable energy server is connected to an electric grid and a network, the renewable energy availability server is configured to transmit a right to recharge certificate;
    a rechargeable device containing a recharge controller, wherein the recharge controller is connected to the electric grid and the network, the recharge controller configured to receive upon request the right to recharge certificate; and
    the recharge controller being further capable of enabling charging of the rechargeable device based on the right to recharge certificate.

2. The system of claim 1, further comprising:
    a proxy in communication with one or more renewable energy availability servers capable of selecting a renewable energy availability server based on the proximity of the renewable energy availability server to the rechargeable device.

3. The system of claim 1, wherein the recharge controller is configured to request association with a second renewable energy availability server when the performance of the renewable energy generator is deemed unsatisfactory.

4. The system of claim 1, wherein the renewable energy availability server is configured to continuously monitor the availability of power from the renewable energy generator.

5. The system of claim 1, wherein the renewable energy server is configured to operate in continuous mode, wherein the right to recharge certificate is continuously updated to reflect the amount of power available from the renewable energy generator.

6. The system of claim 1, wherein the right to recharge certificate is embodied in a continuous frequency transmitted from the renewable energy availability server to the recharge controller.

7. The system of claim 6, wherein the variable frequency is directly associated with the amount of power available from the renewable energy generator.

8. The system of claim 6, wherein the variable frequency is directly associated to the percentage of power available as compared to the maximum power the recharge controller is capable of drawing.

9. A method comprising:
creating a peer-to-peer relationship over an electric grid between a recharge controller connected to a rechargeable device and a renewable energy availability server connected to a renewable energy generator;
extending a right to recharge certificate from the renewable energy availability server to the recharge controller;
charging the rechargeable device based on the contents of the right to recharge certificates.

10. The method of claim 9, further comprising:
modifying the right to recharge certificate to reflect the amount of power available from the renewable energy generator.

11. The method of claim 10, further comprising:
controlling in real-time the consumption of power by the rechargeable device based on the right to recharge certificate.

12. The method of claim 9, further comprising:
operating the renewable energy availability server in an on/off mode.

13. The method of claim 9, further comprising:
monitoring the availability of power from the renewable energy generator.

14. The method of claim 9, wherein the rechargeable device is an electric car.

15. A method comprising:
initiating a charge cycle for a rechargeable device; locating an underutilized renewable energy generator; associating the underutilized renewable energy generator with the rechargeable device; enabling the rechargeable device to access power from the underutilized energy generator; controlling the amount of power made available to the rechargeable device; and transmitting a right to recharge certificate from a renewable energy availability server to a recharge controller.

16. The method of claim 15, wherein the right to recharge certificate is a variable frequency directly associated with the amount of power available from the renewable energy generator.

17. The method of claim 16, wherein the continuous frequency is directly associated to the percentage of power available as compared to the maximum power the recharge controller is capable of drawing.

18. The method of claim 15, further comprising:
requesting association with a replacement renewable energy generator when the performance of the renewable energy generator is deemed unsatisfactory.

19. The method of claim 18, further comprising:
selecting the renewable energy availability server based on the proximity of the renewable energy availability server to the rechargeable device.

* * * * *